United States Patent
Sommer et al.

(10) Patent No.: US 7,153,075 B2
(45) Date of Patent: Dec. 26, 2006

(54) PRESS FIT FASTENER AND METHOD OF PRODUCING IT

(75) Inventors: Wolfgang Sommer, Gemünden (DE); Frank Wagner, Grossen Buseck (DE)

(73) Assignee: KAMAX-Werke Rudolf Kellerman GmbH & Co. K.G., Osterode am Harz (DE)

( * ) Notice: Subject to any disclaimer, the term of this patent is extended or adjusted under 35 U.S.C. 154(b) by 102 days.

(21) Appl. No.: 10/730,216

(22) Filed: Dec. 8, 2003

(65) Prior Publication Data

US 2004/0115026 A1    Jun. 17, 2004

(30) Foreign Application Priority Data

Dec. 10, 2002  (DE) ................................ 102 58 149

(51) Int. Cl.
*F16B 35/04*    (2006.01)

(52) U.S. Cl. ...................................... 411/412; 411/411

(58) Field of Classification Search ................ 411/411, 411/412, 424, 420, 421
See application file for complete search history.

(56) References Cited

U.S. PATENT DOCUMENTS

| | | | | |
|---|---|---|---|---|
| 2,024,071 A | * | 12/1935 | Steadman et al. | 411/424 |
| 2,407,928 A | * | 9/1946 | Herreshoff et al. | 411/366.1 |
| 2,650,032 A | * | 8/1953 | Godfrey | 238/375 |
| 2,895,368 A | * | 7/1959 | Trigg, Jr. et al. | 411/396 |
| 3,252,495 A | * | 5/1966 | Waltermire | 411/176 |
| 3,418,012 A | * | 12/1968 | La Torre | 403/408.1 |
| 3,418,013 A | * | 12/1968 | Kelly | 403/22 |
| 3,455,587 A | * | 7/1969 | Gallois | 403/408.1 |
| 3,456,972 A | * | 7/1969 | Drotar | 403/408.1 |
| 4,018,132 A | * | 4/1977 | Abe | 411/413 |
| 4,815,907 A | * | 3/1989 | Williamson et al. | 411/107 |
| 4,941,337 A | * | 7/1990 | Emery | 72/88 |
| 5,645,386 A | * | 7/1997 | Damm et al. | 411/412 |
| 5,702,214 A | * | 12/1997 | Duran | 411/5 |
| 5,785,478 A | * | 7/1998 | Rotter | 411/487 |

(Continued)

FOREIGN PATENT DOCUMENTS

DE    4318494 C1    2/1995

(Continued)

OTHER PUBLICATIONS

KAMAS Advertising Brochure entitled "Wheel Studs. For Passenger Cares and Commercial Vehicles. KAMAS Connecting the World".

(Continued)

*Primary Examiner*—Robert J. Sandy
*Assistant Examiner*—Jeffrey A. Sharp
(74) *Attorney, Agent, or Firm*—Thomas, Kayden, Horstemeyer & Risley LLP (57) ABSTRACT

A press fit fastener (1) includes a shank (2), a head (3) and a press fit portion (4) being located at the shank (2). The head (3) is located at the first end of the shank (2). The press fit portion (4) includes a multiple helical profile (5). The helical profile (5) has a beginning portion (6) and an inclination portion (8). The outer diameter of the inclination portion (8) is designed to increase in a direction towards the head (3) to reach a maximum outer diameter. The maximum outer diameter of the inclination portion (8) is spaced apart from the head (3). The method of producing the press fit fastener (1) includes the steps of cold forming a press fit portion (4) at the shank (2) of the fastener (1) to produce a cylindrical helical profile (5) including a plurality of pitches, and calibrating the helical profile (5) without producing chips to produce an inclination portion (8) in which the outer diameter of the press fit portion (4) in a direction towards the head (3) increases to reach the maximum outer diameter. The maximum outer diameter of the inclination portion (8) being spaced apart from the head (3).

16 Claims, 11 Drawing Sheets

U.S. PATENT DOCUMENTS

| | | | |
|---|---|---|---|
| 6,174,117 B1 * | 1/2001 | Kawatani et al. | 411/107 |
| 6,264,414 B1 * | 7/2001 | Hartmann et al. | 411/411 |
| 6,296,319 B1 * | 10/2001 | Hummel et al. | 301/35.621 |
| 6,503,038 B1 * | 1/2003 | McGough | 411/424 |
| 6,537,007 B1 * | 3/2003 | Kawatani et al. | 411/180 |
| 6,612,794 B1 * | 9/2003 | Kawatani et al. | 411/107 |
| 6,872,041 B1 * | 3/2005 | Lohr | 411/378 |
| 2003/0068214 A1 * | 4/2003 | Sommer et al. | 411/533 |
| 2003/0118421 A1 * | 6/2003 | Kawatani et al. | 411/107 |
| 2004/0001744 A1 * | 1/2004 | Kawatani et al. | 411/180 |
| 2004/0115026 A1 * | 6/2004 | Sommer et al. | 411/180 |

FOREIGN PATENT DOCUMENTS

| | | |
|---|---|---|
| GB | 891809 | 3/1962 |
| NR | 1804155 | 1/1960 |

OTHER PUBLICATIONS

Hartmann, Gunther, "Cold forming of narrow Tolerances Demonstrated for Truck Wheel Bolts", Research and Development, KAMAX-Werke, R. kellermann GmbH & Co., KG, pp. 1-5, no date.

"Innovations in the Commercial Vehicle Industry", Technical Congress at the 57th IAA Commercial Vehicles, Sep. 8, 1998, Hanover, 1 page.

Hartmann, Gunther, Verbindungselemente kostengunstiger fertigen Umformen ist wirtschaftlicher als schleifen, pp. 1-3, no date (not translated).

* cited by examiner

Fig. 13

PRESS FIT FASTENER AND METHOD OF PRODUCING IT

CROSS REFERENCE TO RELATED APPLICATIONS

This application claims priority to co-pending German Patent Application No. 102 58 149.5 entitled "Presspassverbindungselement und Verfahren zu dessen Herstellung", filed Dec. 10, 2002.

FIELD OF THE INVENTION

The present invention generally relates to a press fit fastener including a shank, a head being located at one end of the shank and a press fit portion being located at the shank. The press fit portion includes a multiple helical profile including a beginning portion.

Such press fit fasteners in combination with a corresponding bore being located in a component serve to attain a press fit connection. In a press fit connection, the outer diameter of the press fit portion located on the fastener is always greater than the inner diameter of the bore to realize the desired secure frictional connection between the fastener and the bore.

BACKGROUND OF THE INVENTION

A press fit fastener, especially a wheel stud, is known from German Patent No. 43 18 494 C1. The known press fit fastener includes a shank, a head being located at one end of the shank and a press fit portion being located at the shank. The press fit portion includes a multiple helical profile. As any other thread, the helical profile also includes a beginning portion and an end portion. The helical profile includes a plurality of convolutions having a respective angle of inclination, the so-called helix angle. With the known press fit fastener, the desired press fit connection may be securely attained if the corresponding bore in the component has been produced with comparatively high quality, meaning with a comparatively small tolerance. In the case of bores of this kind, such a small tolerance is to be understood as a tolerance approximately in the region of IT 7 or less according to the ISO tolerances. Such exact manufacture of the diameter of the bore requires additional treatment after initial drilling. For example, such treatment may include grinding or rubbing to improve the surface quality. This second additional processing step increases the production cost for the manufacture of the component and consequently for the elements of the press fit connection to be attained. The known press fit fastener is always used in combination with a bore located in the component which has been manufactured by at least two production steps.

Theoretically, it would also be possible not to use a second finishing process step, or the bore could have a comparatively great tolerance due to other reasons. Such a bore then has a tolerance in a region of approximately IT 10 to IT 12. This means that the difference of the values of the inner diameter of the greatest bore within the tolerance zone and the smallest bore within the tolerance zone is comparatively great. In case the known press fit fastener was introduced into such a bore in the component having a comparatively great inner diameter, the overlap and the friction resulting therefrom would not be sufficient to ensure the desired press fit. There would be the danger of the press fit fastener being unintentionally detached from the bore. In the other case, if the known press fit fastener was introduced into a bore having a comparatively small inner diameter, there would necessarily be strong elastic and plastic deformations of the press fit portion of the press fit fastener as well as of the bore of the component. As a result, there would be undesired tension in the component and in the press fit fastener. The press fit fastener and/or the component including the corresponding bore could then not be reused after first detachment of the press fit connection. Consequently, the bore and the fastener could not be reused to realize another press fit connection.

A wheel stud including an axial knurl is known from the leaflet of KAMAX "Wheel studs. For passenger cars and commercial vehicles. KAMAX Connecting the world" (edition 2001). The illustrated knurled wheel stud may be used for realizing a press fit connection with a corresponding bore being located in a hub and being produced with a comparatively great tolerance. The axial knurled stud does not include a helical profile in the press fit portion. Instead, it includes a knurled press fit portion including knurls which extend in an axial direction. This means that the press fit portion includes a majority of adjacent parallel ribs and channels. In case such a known axial knurled stud is pressed into a bore having a comparatively small inner diameter being located in a hub being made of a comparatively soft material, there will be strong elastic and plastic deformations in the region of the inner surface of the bore of the component. Due to the strong axial direction of the ribs, the inner surface of the bore will also be plastically deformed to attain a knurled design. When the known axial knurled stud is introduced into a comparatively small bore of a hub being made of a comparatively hard material, there will be shearing effects in the region of the tips of the ribs of the knurl. In both hereinabove explained cases, the substantial elastic and plastic deformations, are the reason why the known stud and/or the component cannot be reused. This means that it is not possible to dismount the stud from the bore and to later introduce this stud into this bore, to introduce this stud into another bore, or to introduce another stud into this bore.

Another fastener for connecting two components under pre-tension is known from U.S. Pat. No. 3,418,012. The known fastener includes a tapered swaging portion with channels and ribs substantially extending in an axial direction. In contrast to a thread or to a helical profile, the channels and the ribs are either arranged exactly axially, meaning with an angle of inclination of 90°, or with an angle of inclination being slightly below 90°. The fastener is introduced into two aligned bores being located in two components being arranged one above the other. For this purpose, the bores have been commonly produced in the two components such that the diameter of the cylindrical bore is approximately between $\frac{1}{1000}$ inch to $\frac{12}{1000}$ inch smaller than the maximum diameter of the shank of the fastener being directly located below the head. The fastener is introduced into the bore by a rotational movement. This rotational movement results in elastic and plastic deformation of the formerly cylindrical bore. Due to the cone-like shape of the shank of the fastener, the bore is deformed such that it also attains a conical design.

Press fit fasteners including a shank, a head being located at one end of the shank and a press fit portion including knurls are known from British Patent No. 891,807 and U.S. Pat. No. 3,252,495. The knurl element consists of spaced apart, parallel knurled portions continuously extending about the axis of the fastener. The knurl portions include knurl elements substantially extending in the direction of the axis of the fastener. Preferably, the knurl elements are inclined by an angle of approximately 10° with respect to the screw axis to ensure rotation of the press fit fastener when introducing the fastener into a corresponding bore.

SUMMARY OF THE INVENTION

The present invention relates to a press fit fastener including a shank, a head and a, press fit portion being located at the shank. The shank has a first end and a second end. The head is located at the first end of the shank. The press fit portion has an outer diameter, and it includes a multiple helical profile. The helical profile has a beginning portion and an inclination portion. The inclination portion has an increasing outer diameter. The outer diameter of the inclination portion is designed to increase in a direction towards the head to reach a maximum outer diameter. The maximum outer diameter of the inclination portion is spaced apart from the head.

The novel press fit fastener may be pressed into a bore which has been produced with a comparatively great tolerance while realizing a good securing effect and allowing for the fastener and the bore to be reused.

With the novel press fit fastener, it is possible to securely and reliably attain press fit connections even when the tolerance of the bore being located in the component is comparatively great. For example, the fastener may be designed as a wheel stud, and the component may be designed as a hub of a motor vehicle such as a car or a truck. When it is not possible or not desired to exactly produce the inner diameter of the bore to attain a tolerance in a region of IT 6 to IT 8—preferably IT 7—for example by grinding, the bore after the initial drilling has a tolerance of approximately between IT 10 to IT 12, mostly IT 11. This means that the difference of the values of the inner diameter of the greatest bore within the tolerance zone and the smallest bore within the tolerance zone is comparatively great. When the novel press fit fastener is introduced into such a bore having a comparatively great inner diameter, the overlap in the region of the maximum outer diameter of the press fit portion of the press fit fastener is sufficient to produce the required friction to securely attain the desired press fit. There is no danger of the press fit element being unintentionally detached from the bore. When the novel press fit fastener is pressed into a bore having a comparatively small inner diameter, the inclination portion of the press fit portion does not show any elastic and plastic deformations or at least less deformations than the portion having the maximum outer diameter of the press fit portion. The inclination portion is to be understood as a portion in which the outer diameter increases in the direction towards the head of the screw, but the diameter of which is still less than the maximum outer diameter of the press fit portion. Undesired tensions possibly prevailing in the component and in the fastener are substantially reduced, and the press fit fastener and the component including the corresponding bore may be reused after detachment of the press fit connection to produce another press fit connection. The inclination portion of the press fit connections ends spaced apart from the head of the fastener to prevent undesired tension in the region of the head or close to the head to prevent setting effects possibly resulting therefrom.

According to the definition of the invention, the inclination portion of the press fit portion is to be distinguished from the beginning portion which is a necessary part of each helical profile. A helical profile is to be understood as a continuous impression winding about the screw axis of the fastener such that there are protrusions between each of the turns which also extend about the screw axis in a thread-like manner. The beginning portion of the helical profile is the transition region between the part of the shank in which there is no helical profile and the part of the shank in which the helical profile continues. In this portion, there will always be a slight inclination of the outer diameter due to the way the helical profile is produced. This means that the outer diameter slightly increases in this portion. However, in conventional helical profiles according to the prior art, the outer diameter does not further increase. A prior art press fit portion includes a constant core diameter and a constant outer diameter with the only exceptions of the comparatively short beginning portion and the end portion of the helical portion. In contrast thereto, the novel press fit portion and the helical profile being located therein, respectively, in addition to the beginning portion includes an (additional) inclination portion in which the outer diameter increases. It is preferred that the core diameter of the helical profile, however, is constant.

In addition to the at least one inclination portion in which the outer diameter according to the definition of the invention increases to reach the maximum diameter, there may be a majority of additional portions in the press fit portion. For example, these portions may have different angles of inclination with respect to their outer diameters, or they may be interconnected by cylindrical adding portions. All these different exemplary embodiments have the common feature of including at least one inclination portion in which the outer diameter of the press fit portion increases to reach the maximum outer diameter of the press fit portion. According to the definition of the invention, the inclination portion ends at this place. When a cylindrical portion having the maximum outer diameter is located next to this place, it is herein referred to as adding portion. Depending on the further design of the press fit portion, the adding portion may then extend along a more or less great axial part of the press fit portion. Another possibility is to arrange a plurality of inclination portions in an axially spaced apart manner. In this case, the inclination portions are separated by declination portions. For example, two clamping portions may be formed in this way, the clamping portions realizing an additional aligning effect of the novel press fit fastener in the bore of the component.

The press fit portion may further include a declination portion in which the outer diameter decreases in a direction towards the head. The declination portion may especially be arranged to be mirror symmetrical with respect to the inclination portion. This has special advantages when producing the novel fastener since axial forces acting upon the fastener are especially prevented during rolling. In addition to these manufacturing technique advantages; such a design results in advantageous distribution of the tension in the region of the bore being a located in the component. The stress acting upon the material in critical edge portions of the component is reduced.

The press fit portion may have the shape of a barrel. Such a barrel-like shape may especially be produced by rolling. In such a barrel-like or ball-like outer shape of the helical profile and of the press fit portion, respectively, there theoretically exists only one place (or at least only a small portion) extending in an axial direction which has the maximum outer diameter. The adjacent locations in both axial directions, however, practically also have the maximum outer diameter due to the comparatively small angle of inclination and due to deformations occurring during insertion of the press fit fastener into a bore. In this way, it is ensured that the axial extension of this portion is sufficient to realize the desired overlap. The press fit portion may be designed such that the entire helical profile serves to realize the press fit connection. However, it is also possible that a part of the helical profile does not have an overlap with the inner diameter of the bore, meaning that it realizes a clearance fit or a transition fit. In this case, an adjacent portion of the helical profile towards the increasing outer diameter has the required overlap such that the desired press fit is realized. Due to the barrel-like design, the pressing in forces and the pressing out forces do not substantially vary.

The press fit portion may further include a cylindrical adding portion having the maximum outer diameter and being located next to the inclination portion in a direction towards the head. Instead of the above described design similar to a barrel, the press fit portion in addition to the inclination portion may thus include an additional cylindrical portion ("cylindrical adding portion"). The cylindrical adding portion has a certain substantial axial extension such that the inclination portion is spaced apart from the head of the fastener. The cylindrical adding portion also ends spaced apart from the head of the fastener to prevent unintentional stresses. In this way, it is ensured that the portion of the maximum diameter meaning its axial extension, is sufficient to realize the desired fixed press fit.

The cylindrical adding portion may be located between the inclination portion and the declination portion of the press fit portion. With this design, one may attain a mirror symmetrical.; shape having a positive effect on the manufacture technique of the fastener.

The helical profile may be designed to include at least pitches or threads. The helix angle of the helical profile may especially be between 5° and 30°. Depending on the design of the helical profile and of the press fit portion, it is also possible to use a substantially greater amount of pitches, for example up to 24 pitches. The helix angle preferably is between 9° and 11°. The helix angle is to be understood as the angle between an imaginary line perpendicular with respect to the axis of the fastener and the helix. Choosing the helix angle in a region of between approximately 5° and 30°, and preferably between approximately 9° and 11°, provides for the advantage of the outer surfaces of the helix not elastically and plastically displacing material of the inner surface of the bore as strong as was is the case when using greater angles or smaller angles. One can imagine that the material of the bore is elastically and plastically deformed along the entire axial extension when pressing the press fit fastener into a bore in case the helix profile would have a great helix angle or when using an axial profile having a helix angle of 90°. In such a case, the bore would also have a knurled design since the material of the wall of the bore cannot be elastically deformed in an axial direction, but the material rather elastically and plastically flows into adjacent impressions. When prior art fasteners use small helix angles, for example approximately 3° in the case of a helical profile including three pitches, there is a shearing effect of the outer surface of the helix profile to an increased extent. Consequently, these prior art constructions result in greater elastic and plastic deformations than the novel fastener including the above described helix angles. The stronger axial arrangement of the helix profile results in reduced frictional forces. Compared to a helical profile including three pitches and an identical overlap, the pressing-in forces are reduced.

A threaded portion including a thread having an effective diameter (the so called flank diameter) may be located at the end of the shank facing away from the head of the fastener. The helical profile may have a core diameter which is greater or which equals the flank diameter of the thread. Due to this design, the helical profile has a stressed cross-section which preferably is approximately 15% or more greater than the stressed cross-section of the thread. The helical profile has a substantially smaller profile height than a normal thread. The comparatively increased stressed cross section has the effect of (at least initially) only the thread being stretched when the press fit fastener is overstretched by too strong tightening with a nut or the like engaging the thread. It is ensured that it is not the press fit portion which is deformed. Consequently, secure frictional connection of the press fit portion is ensured even when applying great tightening torque.

The novel fastener may further include a centering section having an outer diameter. The centering section is located next to the beginning portion of the helical profile. The outer diameter of the centering section is greater than the outer diameter of the thread, and it is smaller than the minimum outer diameter of the helical profile in the beginning portion. The centering portion serves to simplify axial insertion of the press fit fastener into the corresponding bore being located in the component. Preferably, the centering portion has the shape of a truncated cone. When using such a design, the desired centering effect is securely attained when inserting the centering portion into the bore being located in the component. Preferably, the centering portion does not include a profile, and it may have an outer diameter approximately corresponding to the flank diameter of the thread.

The centering portion may have an axial length between approximately 10% and 50%, preferably 25%, of the maximum outer diameter of the press fit portion. This design ensures that undesired inclined insertion of the press fit fastener into the bore is prevented.

The press fit fastener may be designed as a wheel stud. Such wheel studs are used to connect the hub of a car or of a truck with the rim of wheel. For this purpose, the wheel stud is connected with the hub by the press fit connection. After assembly of the wheel, the nut is screwed onto the thread being located at the free end of the wheel stud. It is to be understood that the novel press fit fastener may also have a different design, for example the one of a screw, and that it may be used for realizing any other press fit connections.

The overlap of the press fit preferably has a minimum of approximately 0.25% and a maximum of approximately 1.1%. This results in an overlap range of approximately 0.85%. The prior art, and especially German Patent No. 43 18 494 C1 (see page 4, line 36–38) teaches an overlap of helical profiles of between 0.3 to 0.7%. The resulting overlap range is 0.4%. With the novel fastener, a greater overlap range may be used which results in the manufacture cost of the novel press fit fastener being reduced.

The novel method for producing a press fit fastener including a shank and a head includes the steps of cold forming of a press fit portion at the shank of the fastener to produce a cylindrical helical profile including a plurality of pitches, and calibrating the helical profile without producing chips to produce an inclination portion in which the outer diameter of the press fit portion in a direction towards the head increases to reach the maximum outer diameter, the maximum outer diameter of the inclination portion being spaced apart from the head. Calibrating without producing chips may especially be attained by rolling or by precision forming. The helical profile preferably has a bearing percentage of at least approximately 30%. The bearing percentage may be between approximately 30% and 80%, preferably between 40% and 70% and approximately between 50 to 60% in the preferred embodiment. The bearing percentage is to be understood as the surface at the outer diameter of the helical profile which contacts the inner wall of the bore after having pressed the press fit portion into the corresponding bore. The percentage relates to the cylindrical surface area of the bore while imagining that the bore and the press fit portion have the same axial length.

The core diameter of the helical profile remains approximately constant even during calibrating of the helical profile in the inclination portion. The outer diameter of the helical profile preferably is calibrated with such an exactness that it has a tolerance of IT 7. In this way, the requirements of the tolerance of the corresponding bore in the component are reduced.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
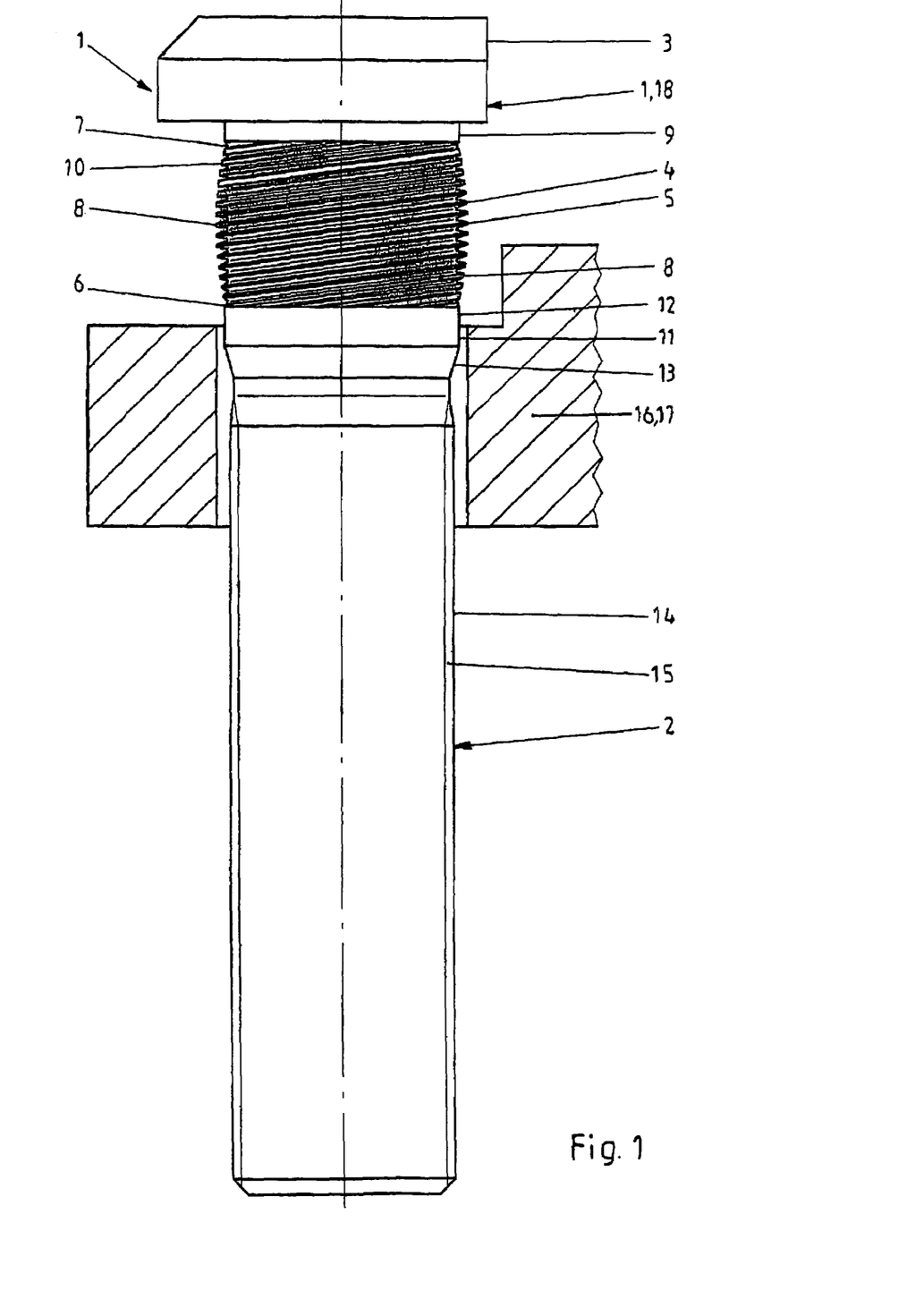
FIG. 1 is a view of a first exemplary embodiment of the novel fastener before realizing a press fit connection.

Referring now in greater detail to the drawings, FIG. 1 is a view of a first exemplary embodiment of the novel press fit fastener 1. The press fit fastener 1 includes a shank 2 and a head 3 being connected to the shank 2. A press fit portion 4 including a multiple helical profile 5 is also located at the shank 2. The exemplary helical profile 5 illustrated in FIG. 1 includes six pitches. The helical profile 5 could also have more pitches, for example up to 24 pitches. The helical profile 5 includes a beginning portion 6 and an end portion 7. In addition to the beginning portion 6, the press fit portion 4 includes an inclination portion 8 in which the outer diameter of the press fit portion 4 increases towards the head 3 to reach the maximum outer diameter. The angle of inclination of the inclination portion 8 is illustrated in a strongly exaggerated way for reasons of clearly illustrating the inclined shape. In reality, the difference between the maximum outer diameter of the helical profile 5 and the minimal outer diameter of the helical profile 5 is much smaller. For example, the difference is in a range of approximately 5/100 mm. The core diameter of the helical profile 5 is approximately constant about the length of the helical profile 5. The maximum outer diameter of the inclination portion 8 of the press fit portion 4 is spaced apart from the head 3. A separating portion 9 is located between the end portion 7 of the helical profile 5 and the bottom side of the head 3. In addition to the inclination portion 8, the press fit portion 4 includes a declination portion 10 in which the outer diameter of the press fit portion 4 decreases towards the head 3. The press fit portion 4 thus generally has a slight barrel-like or ball-like shape.

Next to the beginning portion 6 of the helical profile 5 in a direction away from the head 3, there is a centering section 11. In the illustrated embodiment of the fastener 1, the centering section 11 includes a cylindrical portion 12. Another conical portion 13 is located next to the centering section 11. According to the definition of this invention, the conical portion 13 is not part of the centering section 11. The beginning diameter of the centering section 11 is smaller than the minimum outer diameter of the helical profile 5 in the beginning portion 6. A threaded portion 14 including a thread 15 is located next to the centering section 11. The thread 15 may be designed as a metric thread or any other thread. The diameter of the conical portion 13 increases to reach a value which is greater than the value of the outer diameter of the thread 15 of the threaded portion 14.

FIG. 1 illustrates a position of the novel press fit fastener 1 just before realizing the desired press fit connection with a component 16. Especially, the component 16 may be designed as a hub of a car or of a truck. In such a case, the press fit fastener 1 is designed as a wheel stud 18. The component 16 includes a bore 19 for realizing the desired press fit connection. The bore 19 is designed as a through-hole extending through the component 16. Preferably, the bore 19 is a bore which has been exclusively produced by drilling, meaning without a following processing step. The bore 19 thus has a tolerance of approximately between IT 10 to IT 12. Preferably, the novel press fit fastener 1 is pressed into the corresponding bore 19 of the component 16 with a pure axial force.

Figure 2:
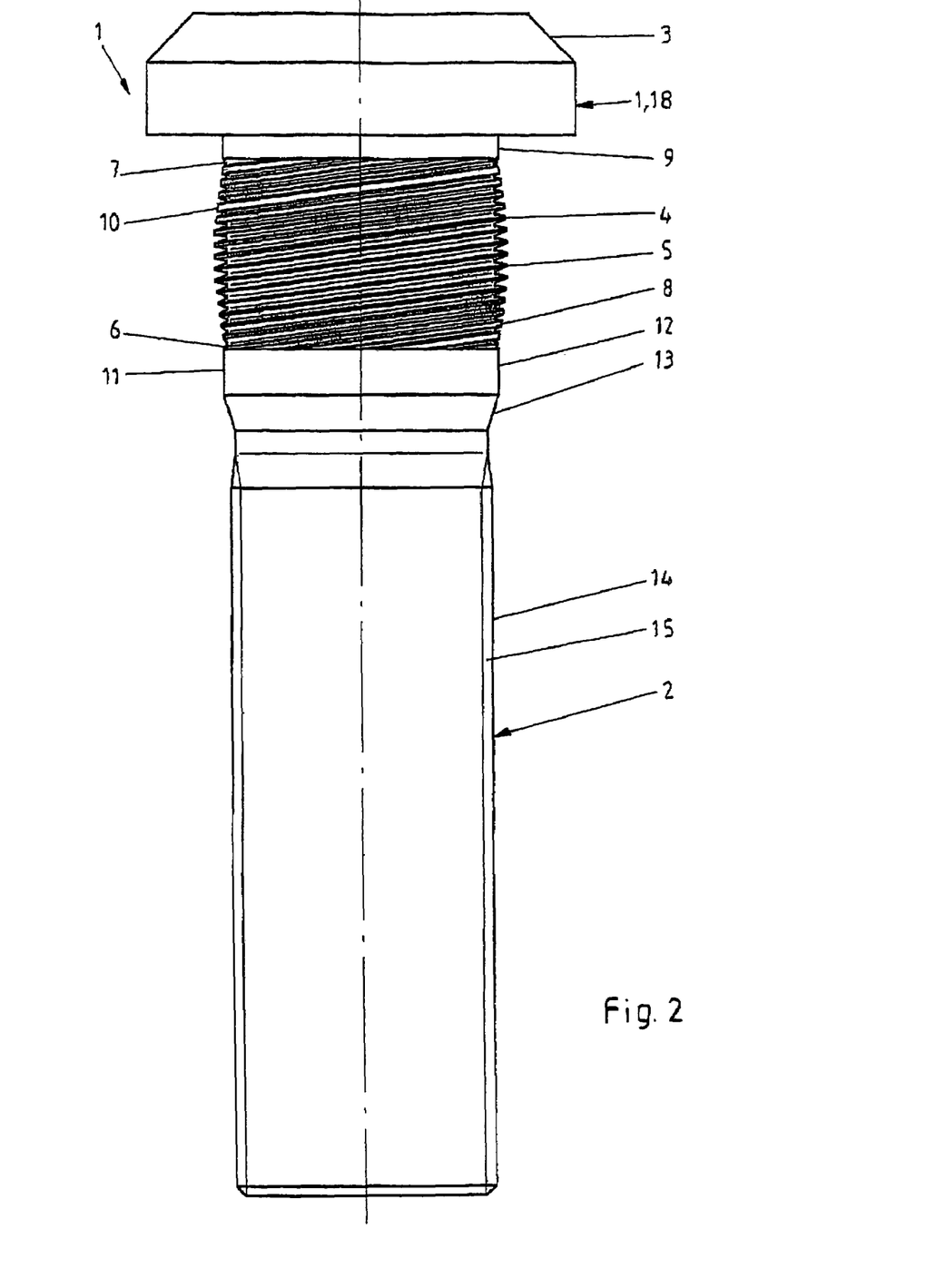
FIG. 2 is a view of a second exemplary embodiment of the novel fastener.

FIG. 2 illustrates a second exemplary embodiment of the novel press fit fastener 1. In this case, the head 3 of the fastener 1 has a slightly different design.

Figure 3:
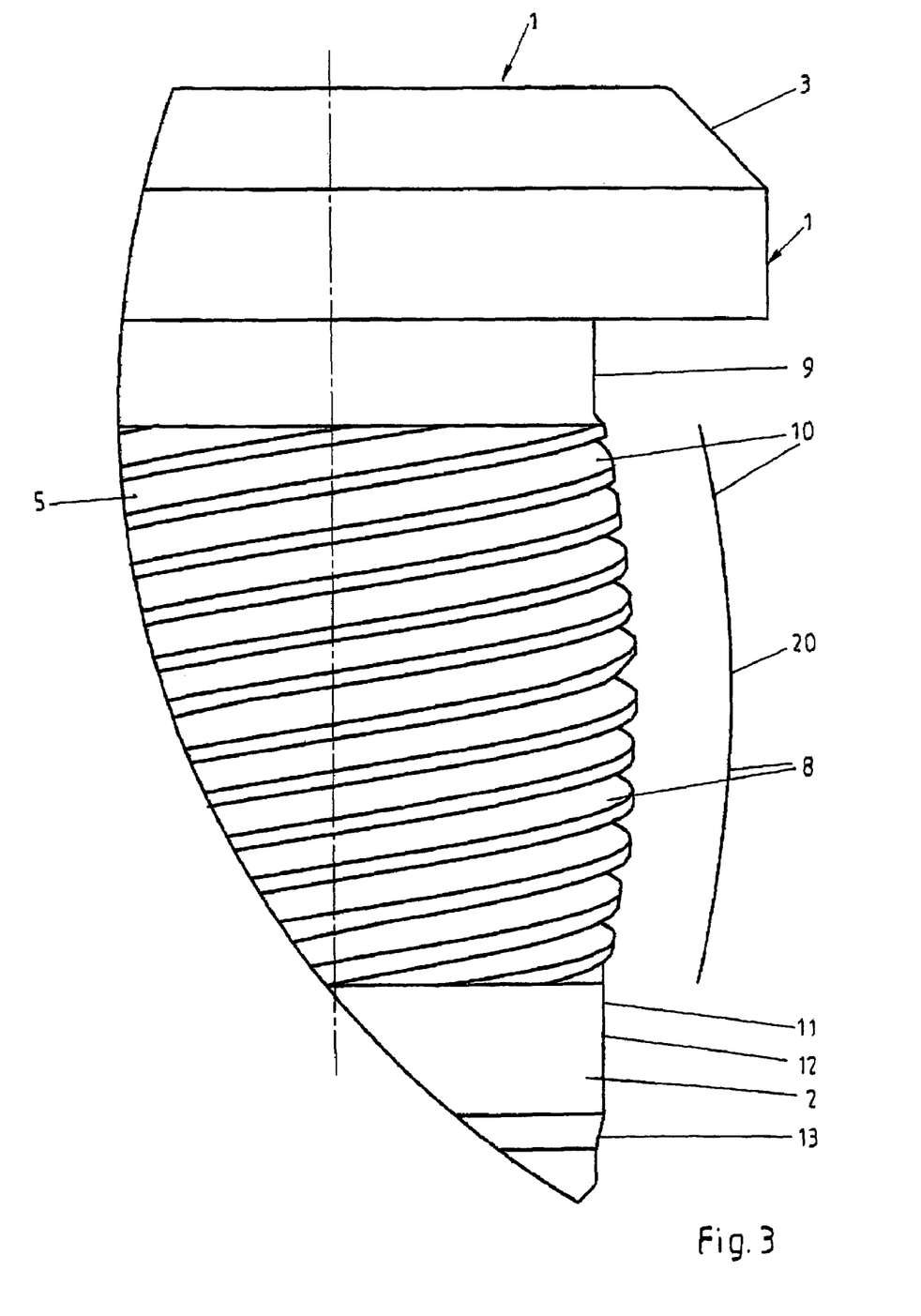
FIG. 3 is a detailed view of the novel fastener according to FIG. 2.

Further details of the helical profile 5 according to FIGS. 1 and 2 are illustrated in FIG. 3. FIG. 3 especially illustrates the barrel-like design of the helical profile 5 of the press fit portion 4 in an exaggerated way. In addition, this design is further symbolized by a line 20.

Figure 4:
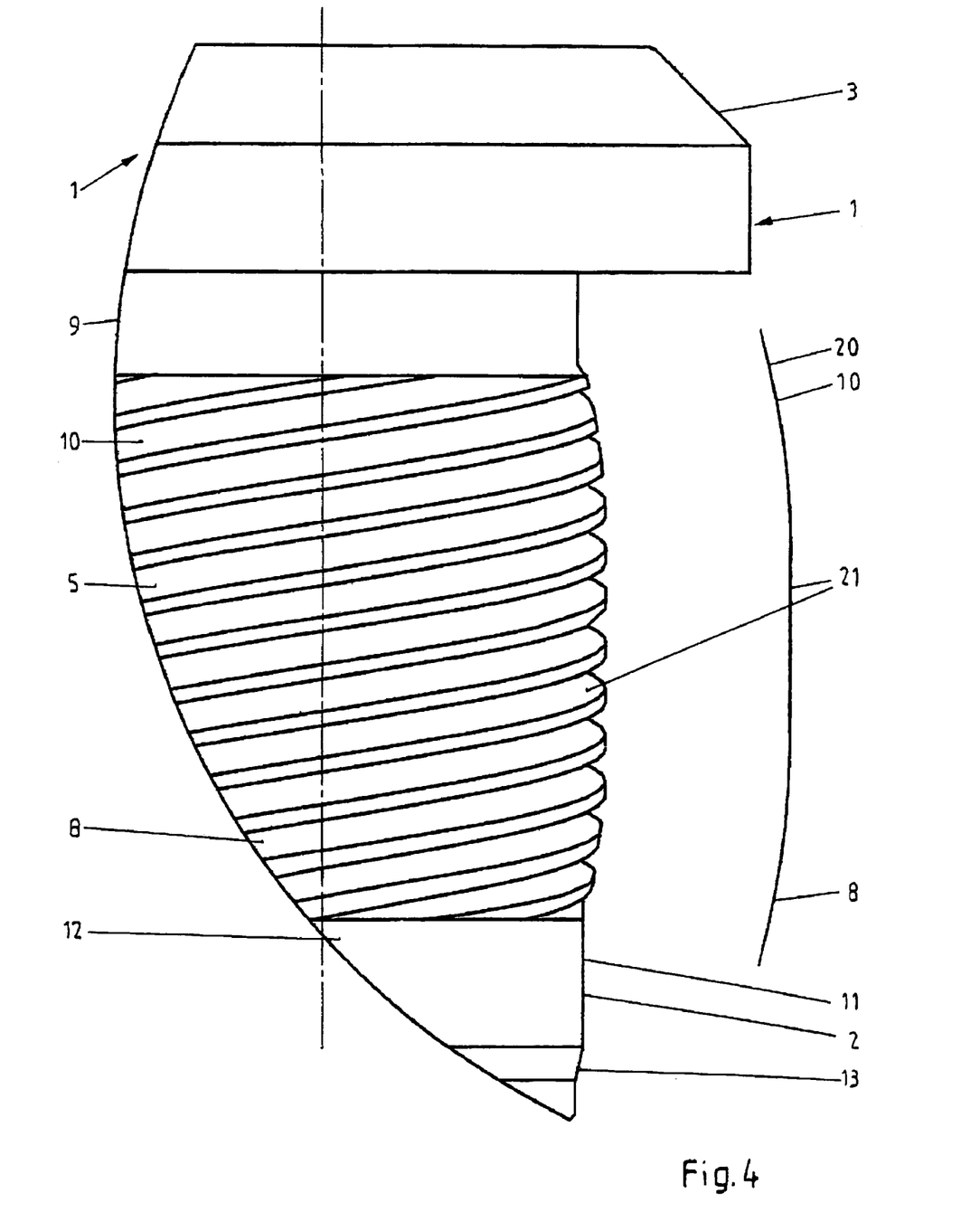
FIG. 4 is a detailed view similar to FIG. 3 of another exemplary embodiment of the novel fastener.

FIG. 4 illustrates another exemplary embodiment of the novel helical profile 5. In this case, it may be seen from line 20 that the helical profile 5 includes an inclination portion 8, a declination portion 10 and a cylindrical adding portion 21. The cylindrical adding portion 21 is arranged between the portions 8, 10 in a mirror symmetrical way. The transition between the regions 8, 10, on the one hand, and 21, on the other hand, in this case includes a radius.

Figure 5:
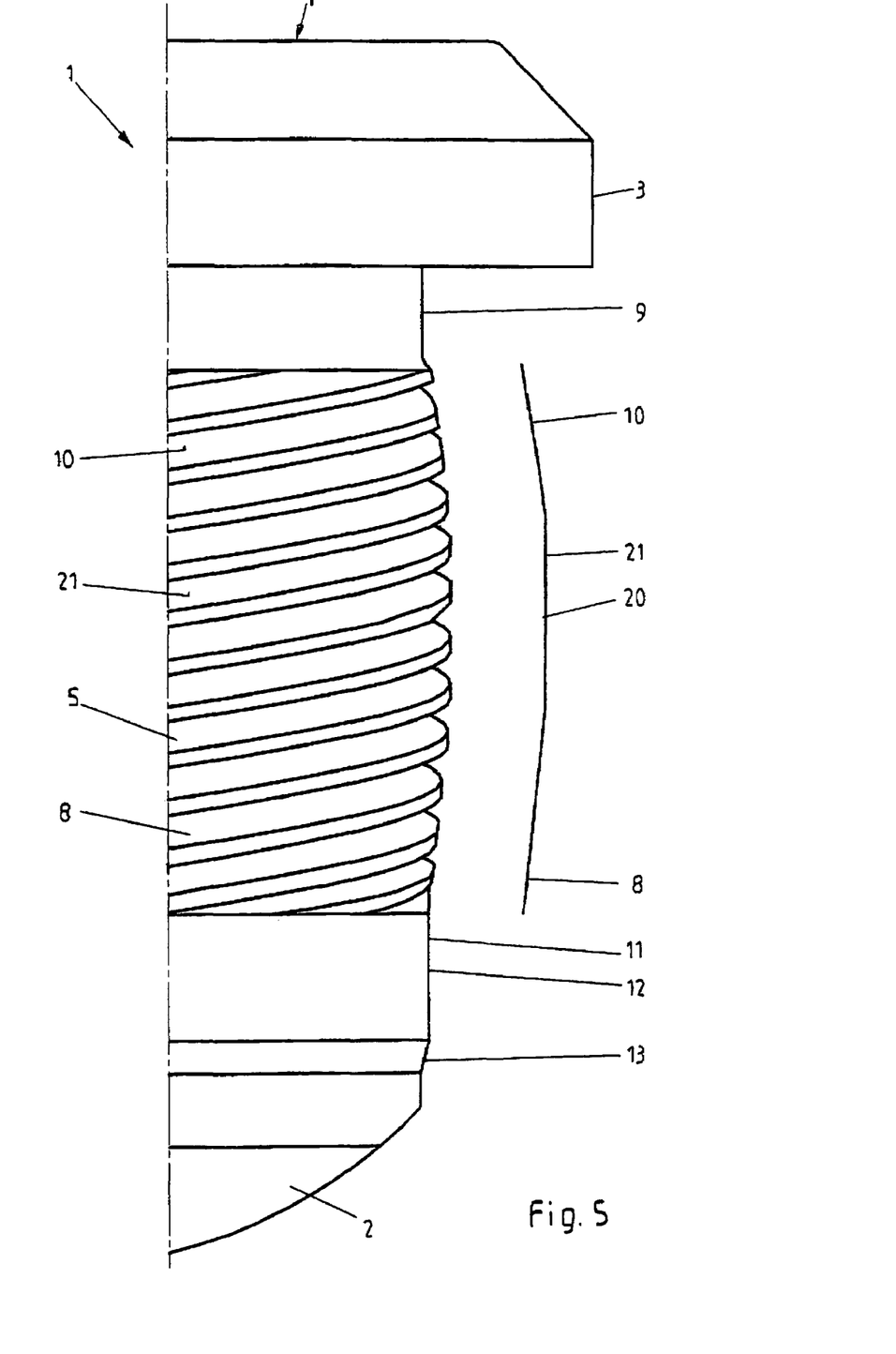
FIG. 5 is a view of another exemplary embodiment of the novel fastener.

According to FIG. 5 the helical profile 5 may include a linear and a sharp design, respectively, instead of including a radius as described hereinabove.

Figure 6:
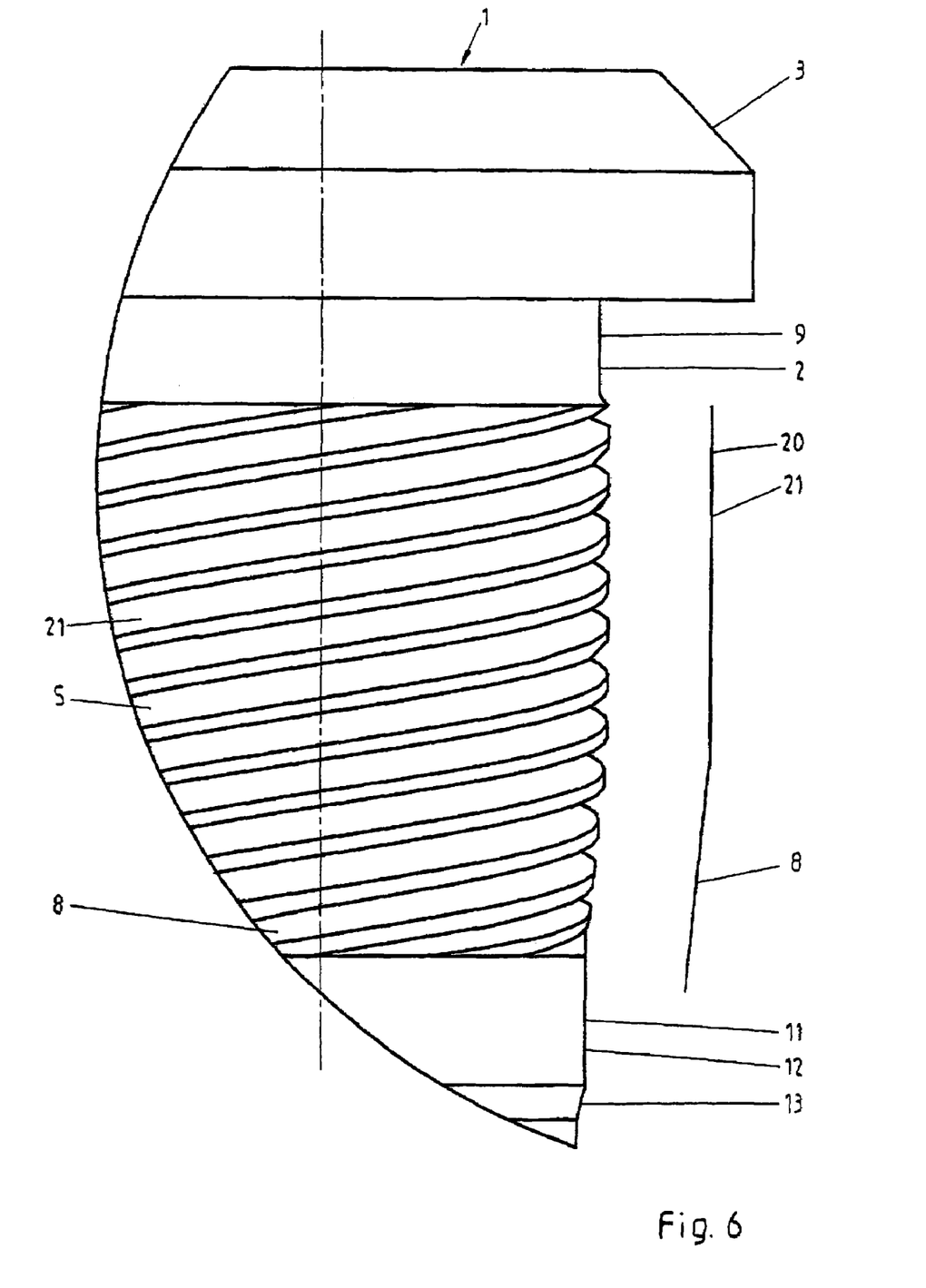
FIG. 6 is a detailed view of the novel fastener according to FIG. 5.

FIG. 6 emphasizes the fact that it is also possible to only include one adding portion 21 in addition to the inclination portion 8. This means that it is not necessary to arrange a declination portion 10.

Figure 7:
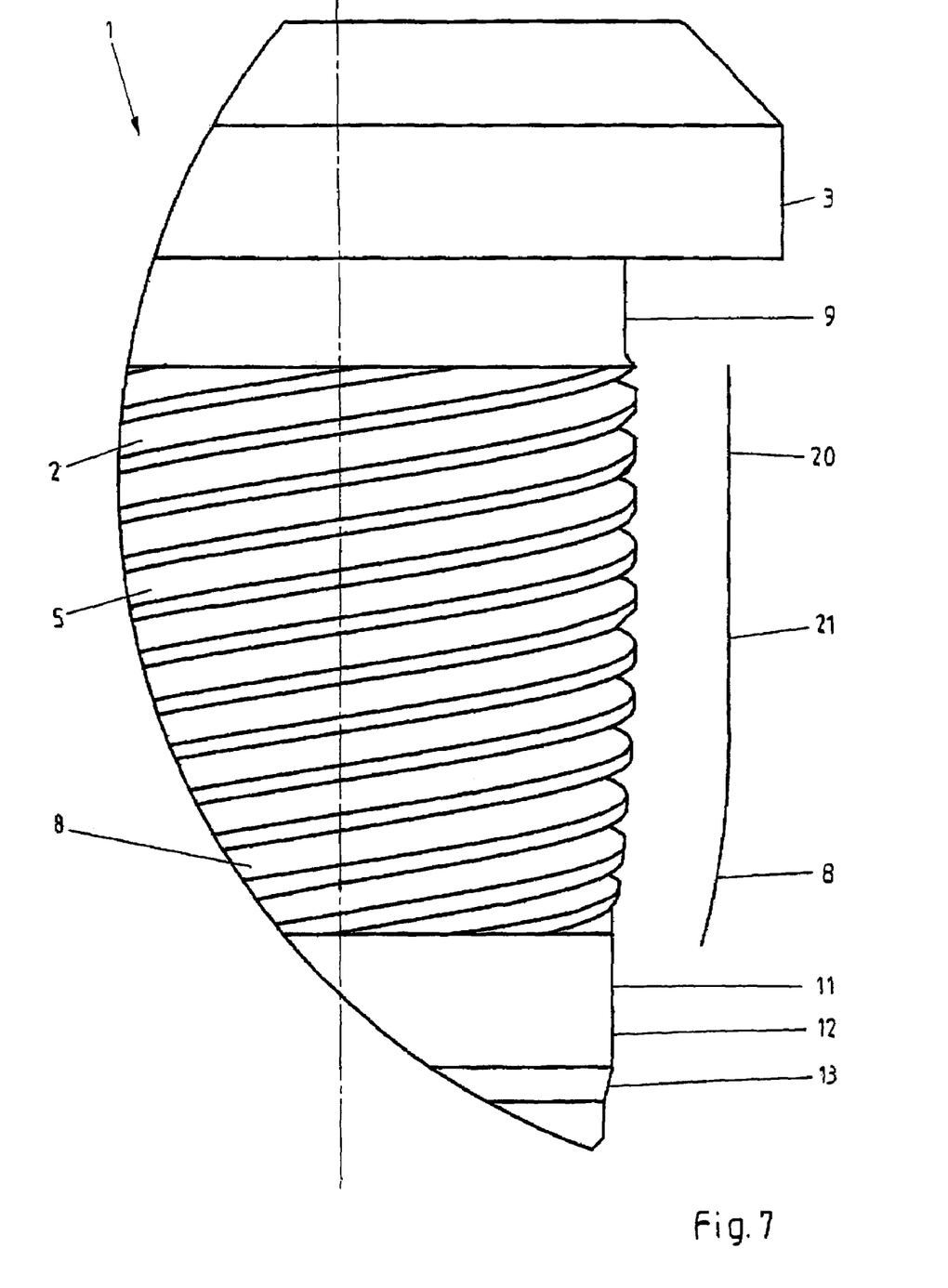
FIG. 7 is a detailed view of another exemplary embodiment of the novel fastener.

FIG. 7 illustrates another exemplary embodiment of the novel fastener 1 similar to FIG. 6. In this case, a radius is used one more time.

Figure 8:
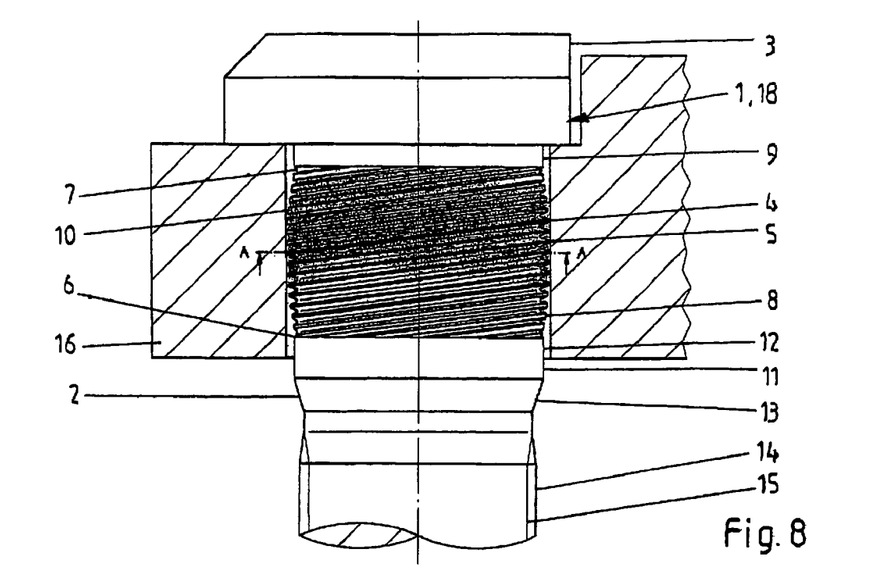
FIG. 8 is a view of the novel fastener according to FIG. 1 in the mounted position.

FIG. 8 illustrates the novel press fit fastener 1 in its position as being mounted in the component 16. It is to be seen from this figure that at least in the region of the maximum diameter of the press fit portion 4 and of the helical profile 5, respectively, there is an overlap between the outer diameter of the helical profile 5 and the inner diameter of the bore 19 such that secure press fit is realized. The illustration of the inclination portion 9 and also of the declination portion 10 are strongly exaggerated for simplifying explanation of the invention. According to FIG. 8, there is a clearance fit at the ends of the helical profile 5. However, the helical profile 5 may also be designed such that there is a press fit in the entire region of the helical profile 5. It is to be understood that even in these cases the value of the overlap at the beginning of the inclination portion 8 is smaller such that there will be reduced elastic and plastic deformations when pressing the novel press fit fastener 1 into the bore 19 compared to the prior art. The region of the maximum overlap or also of the maximum diameter is chosen to be sufficient to ensure the desired press fit for all combinations of tolerances.

Figure 9:
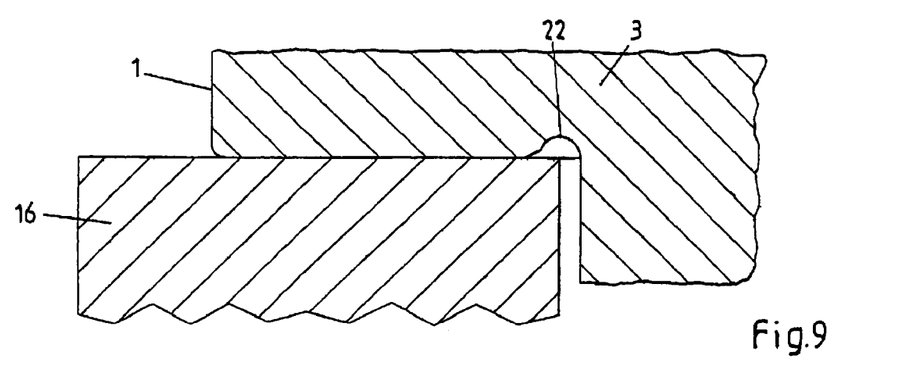
FIG. 9 is a detailed view taken from FIG. 8.

FIG. 9 illustrates a section of the contacting location between the head 3 of the press fit fastener 1 and the component 16. Due to a continuous channel 22 being located at the bottom side of the head 3, it is possible not to arrange a chamfer at the component 16. The channel 22 makes sure that the head 3 with its bottom contact surface contacts the upper surface of the component 16, and that there are no substantial setting effects due to edges and the like protruding from the component 16.

Figure 10:
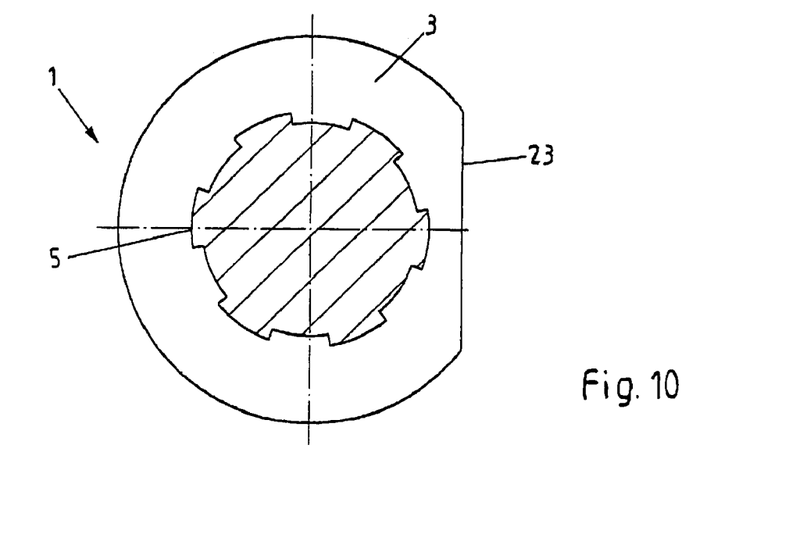
FIG. 10 is a cross-sectional view along line A—A taken from FIG. 8.

FIG. 10 further illustrates the design of the head 5 including a stop 23. The stop 23 in the mounted position serves to prevent undesired rotation of the fastener 1 within the bore 19. Additionally, FIG. 10 illustrates the multiple design of the helical profile 5 including six pitches.

Figure 11:
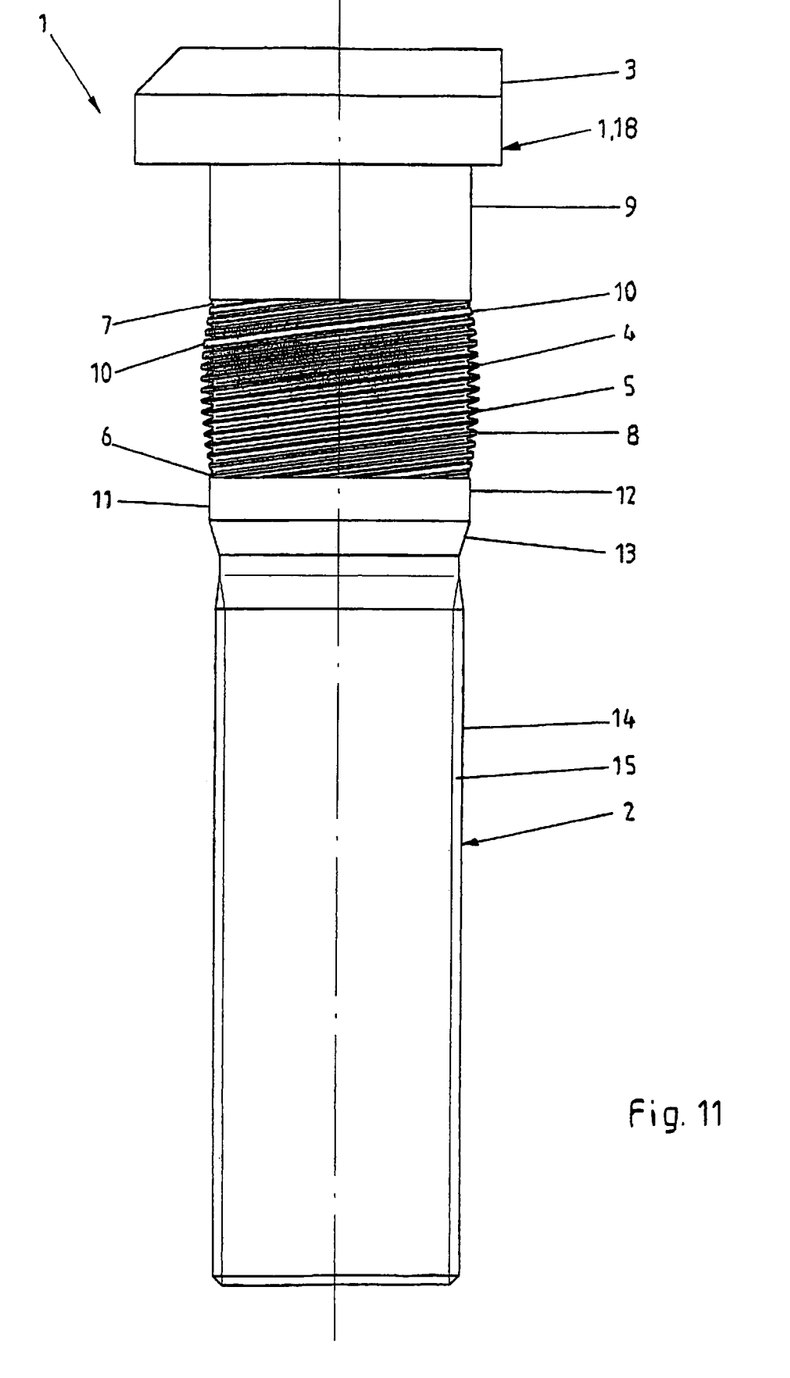
FIG. 11 is a view of another exemplary embodiment of the novel fastener.

FIG. 11 illustrates another exemplary embodiment of the novel press fit fastener 1. In this case, the press fit portion 4 and the helical profile 5 are located even further away from the head 3. Correspondingly, the distance portion 9 has a greater axial length.

Figure 12:
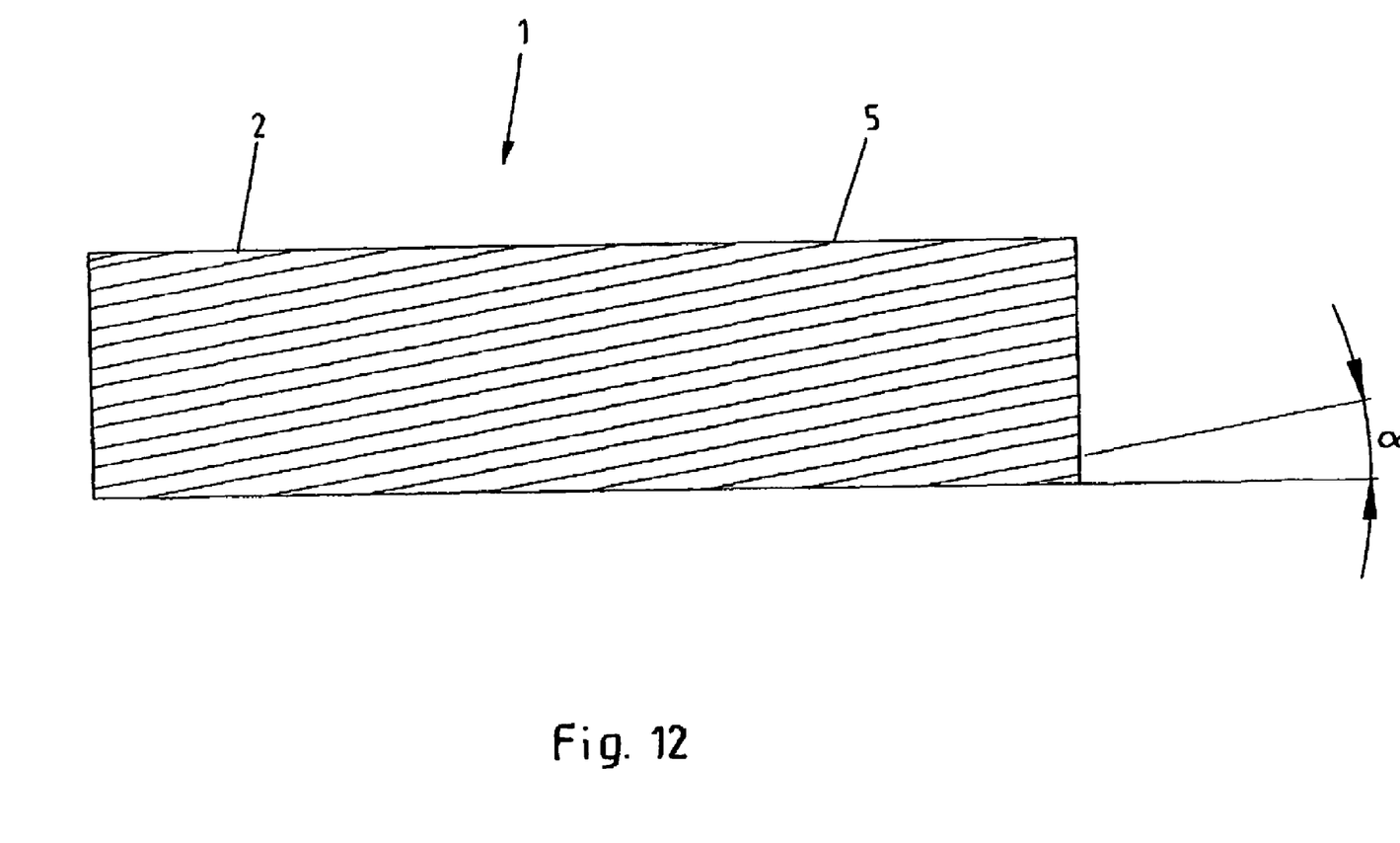
FIG. 12 is a view of the rolled down profile of the helical profile of the novel fastener.

FIG. 12 illustrates the angle of inclination á of the helical profile 5. In the illustrated multiple embodiment including six pitches and the other design aspects of the helical profile 5, the angle of inclination á is in a region of approximately 10°. However, it is also possible to use helical profiles 5 having a smaller or greater number of pitches such the angle of inclination of the helical profile 5 preferably is in a range of approximately 5° to 30°.

Figure 13:
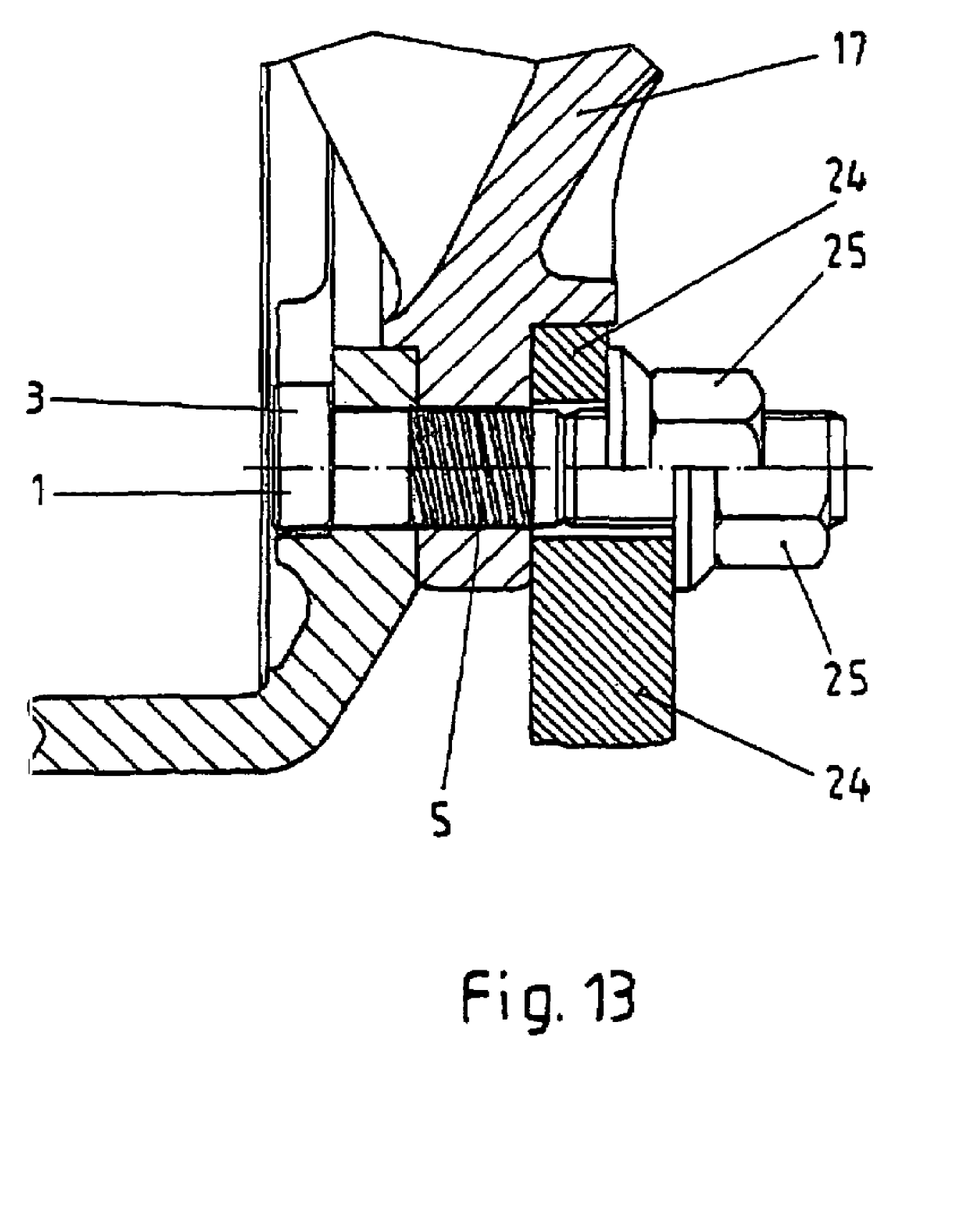
FIG. 13 is a general view of the novel fastener in two mounted positions.

FIG. 13 finally illustrates two practical assembly situations of the novel press fit fastener 1. The first assembly situation is illustrated above the bisecting line, and the second assembly situation is illustrated below the bisecting line. The press fit fastener 1 is designed as a wheel stud 18, and it is fixedly connected to the hub 17 of a car or of a truck. A rim 24 is connected to the hub 17 by the press fit fastener 1 and a nut 25. The rim 24 being illustrated above the bisecting line has a comparatively great wall thickness. For example, it is made of aluminum. The rim 24 being illustrated below the bisecting line has a comparatively thin wall thickness. For example, it is made of steel.

The following table gives an example of a preferred exemplary embodiment of the novel press fit fastener 1.

| Measures of an embodiment of the press fit fastener | | |
| --- | --- | --- |
| outer diameter of the thread | $\varnothing\, d_{thread}$ | 21.85 mm |
| flank diameter of the thread | $\varnothing\, d_{2\, thread}$ | 20.92 mm |
| core diameter of the thread | $\varnothing\, d_{3\, thread}$ | 20.03 mm |
| outer diameter of the maximum helical profile | $\varnothing\, d_{maximum\, helical\, profile\, (calibrated)}$ | 22.57 mm |
| outer diameter of the minimum helical profile | $\varnothing\, d_{minimum\, helical\, profile\, (calibrated)}$ | 22.52 mm |
| flank diameter of the helical profile | $\varnothing\, d_{2\, helical\, profile}$ | 22.30 mm |
| core diameter of the helical profile | $\varnothing\, d_{3\, helical\, profile}$ | 21.79 mm |
| length of the helical profile | $l_{helical\, profile}$ | 15 mm |
| length of the centering portion | $l_{centering\, portion}$ | 6 mm |
| angle of inclination of the helical profile | $á_{helical\, profile}$ | 9.7° |

Many variations and modifications may be made to the preferred embodiments of the invention without departing substantially from the spirit and principles of the invention. All such modifications and variations are intended to be included herein within the scope of the present invention, as defined by the following claims.

We claim:

1. A press fit fastener, comprising:
   a shank having an axis, a first end and a second end;
   a head being located at the first end of said shank;
   a press fit portion being located at said shank, said press fit portion having an outer diameter and including a multiple helical profile, said multiple helical profile having fully formed multiple threads, each thread having at least one full thread revolution about the axis of said shank, said helical profile having a beginning portion and an inclination portion having an increasing outer diameter, the outer diameter of said inclination portion being designed to increase in a direction towards said head to reach a maximum outer diameter, the maximum outer diameter of said inclination portion being spaced apart from said head;
   a cylindrical centering section having an outer diameter, said cylindrical centering section being located next to said beginning portion of said helical profile, the outer diameter of said cylindrical centering section being smaller than the minimum outer diameter of said helical profile in the beginning portion; and
   a conical portion having an outer diameter, said conical portion being located next to said cylindrical centering portion, said conical portion being designed and arranged to taper in a direction towards said second end such that the diameter of said conical portion increases towards said cylindrical centering section.

2. The fastener of claim 1, wherein said press fit portion further includes a declination portion in which the outer diameter decreases in a direction towards said head.

3. The fastener of claim 2, wherein said press fit portion is barrel-shaped.

4. The fastener of claim 1, wherein said press fit portion further includes a cylindrical adding portion, said cylindrical adding portion having the maximum outer diameter and being located next to said inclination portion in a direction towards said head.

5. The fastener of claim 2, wherein said press fit portion further includes a cylindrical adding portion, said cylindrical adding portion having the maximum outer diameter and being located next to said inclination portion in a direction towards said head.

6. The fastener of claim 4, wherein said cylindrical adding portion is located between said inclination portion and said declination portion.

7. The fastener of claim 5, wherein said cylindrical adding portion is located between said inclination portion and said declination portion.

8. The fastener of claim 1, wherein said helical profile includes at least six threads.

9. The fastener of claim 1, wherein said helical profile has an angle of inclination of between approximately 5° and 30°.

10. The fastener of claim 1, further comprising a threaded portion including a thread having a pitch diameter, said threaded portion being located at the second end of said shank in a direction facing away from said head, said helical profile having a core diameter which is greater than the pitch diameter of said thread.

11. The fastener of claim 1, further comprising a threaded portion including a thread having a pitch diameter, said threaded portion being located at the second end of said shank in a direction facing away from said head, said helical profile having a core diameter which approximately equals the pitch diameter of said thread.

12. The fastener of claim 1, further comprising:

a threaded portion including a thread having an outer diameter, said threaded portion being located at the second end of said shank in a direction facing away from said head wherein the outer diameter of said cylindrical centering section is greater than the outer diameter of said thread.

13. The fastener of claim 12, wherein said cylindrical centering section has an axial length which is approximately between 10% and 50% of the maximum outer diameter of said press fit portion.

14. The fastener of claim 12, wherein said cylindrical centering section has an axial length which is approximately 25% of the maximum outer diameter of said press fit portion.

15. The fastener of claim 1, wherein the press fit fastener is designed as a wheel stud.

16. The fastener of claim 1, wherein the inclination portion forms at least approximately 10% of the axial length of the multiple helical profile.

* * * * *